United States Patent
Luo et al.

(10) Patent No.: US 11,802,992 B2
(45) Date of Patent: Oct. 31, 2023

(54) THUNDERSTORM GALE EARLY-WARNING METHOD, SYSTEM, EQUIPMENT, AND TERMINAL

(71) Applicant: Zhejiang Meteorological Observatory, Hangzhou (CN)

(72) Inventors: Ling Luo, Hangzhou (CN); Xuanxuan Huang, Hangzhou (CN); Wenjuan Li, Hangzhou (CN); Juan Huang, Hangzhou (CN); Xiaofen Lou, Hangzhou (CN); Lie Chen, Hangzhou (CN); Guiyang Su, Hangzhou (CN); Ran Luo, Hangzhou (CN); Zhicha Zhang, Hangzhou (CN); Lei Zhang, Hangzhou (CN)

(73) Assignee: Zhejiang Meteorological Observatory, Hangzhou (CN)

( * ) Notice: Subject to any disclaimer, the term of this patent is extended or adjusted under 35 U.S.C. 154(b) by 0 days.

(21) Appl. No.: 17/992,165

(22) Filed: Nov. 22, 2022

(65) Prior Publication Data

US 2023/0161073 A1    May 25, 2023

(30) Foreign Application Priority Data

Nov. 25, 2021  (CN) .......................... 202111416350.2

(51) Int. Cl.
*G01W 1/10*  (2006.01)
*G01S 13/95*  (2006.01)

(52) U.S. Cl.
CPC ............. *G01W 1/10* (2013.01); *G01S 13/95* (2013.01)

(58) Field of Classification Search
CPC ........... G01S 13/95; G01W 1/10; Y02A 90/10
See application file for complete search history.

(56) References Cited

U.S. PATENT DOCUMENTS

| | | | |
|---|---|---|---|
| 2012/0303278 A1* | 11/2012 | Dannevik | G01W 1/00 702/3 |
| 2020/0041693 A1 | 2/2020 | Messager | |
| 2021/0103051 A1* | 4/2021 | Tang | G01S 13/95 |

FOREIGN PATENT DOCUMENTS

| | | | |
|---|---|---|---|
| CN | 103337133 A | | 10/2013 |
| CN | 109738970 A | * | 5/2019 |
| CN | 109814175 A | | 5/2019 |

(Continued)

*Primary Examiner* — Yoshihisa Ishizuka
(74) *Attorney, Agent, or Firm* — Nitin Kaushik

(57) ABSTRACT

The present invention belongs to the field of nowcasting early-warning technology, and discloses a thunderstorm gale early-warning method, system, equipment and terminal. The thunderstorm gale early-warning method comprises: preprocessing single radar data to identify potential thunderstorm gale areas; and in real-time service, calling the thunderstorm gale parameter model in the potential thunderstorm gale areas identified by single radar every time to perform extrapolation for 1 hour, thereby forming a thunderstorm gale early-warning product within the next hour. The thunderstorm gale early-warning method provided by the present invention makes full use of the identification technology of dual polarization radar to identify the potential of thunderstorm gale, acquires falling areas of potential thunderstorm gale within the next hour by the extrapolation technology, and has better advance and accuracy compared with the existing thunderstorm gale early-warning method.

8 Claims, 4 Drawing Sheets

(56) References Cited

FOREIGN PATENT DOCUMENTS

| CN | 110221360 A | 9/2019 |
|---|---|---|
| CN | 112347872 A | 2/2021 |

\* cited by examiner

THUNDERSTORM GALE EARLY-WARNING METHOD, SYSTEM, EQUIPMENT, AND TERMINAL

CROSS-REFERENCE TO RELATED APPLICATIONS

The application claims priority to Chinese patent application No. 2021114163502, filed on Nov. 25, 2021, the entire contents of which are incorporated herein by reference.

TECHNICAL FIELD

The present invention belongs to the field of nowcasting early-warning technology, and discloses a 0-1 hour thunderstorm gale early-warning method, system, equipment and terminal.

BACKGROUND

At present, the nowcasting early-warning technology was developed on the basis of radar extrapolation from 1960s to 1970s. In recent years, the research on the nowcasting early-warning technology of severe convective weather based on radar data has emerged endlessly. Meanwhile, many scholars have combined the conventional ground detection data, sounding data, lightning data, satellite data and mesoscale numerical model data with radar data to improve the spatiotemporal precision of nowcasting early-warning. Researches of a large number of scholars show that radar indicators are indicative for early warning of short-term heavy precipitation. Feng Jinqin utilized the historical data of the new generation weather radar and the conventional observation data to establish radar product shift indicators corresponding to the historical hail and thunderstorm gale procedures, and then combined with a discriminant equation, radar data and the like to research a nowcasting early-warning method. Zhang Lejian counted the nowcasting early-warning methods commonly used in recent years, and applied artificial neural network and support vector machine to the radar nowcasting early-warning, and evaluated the effect as follows: when the forecasting time is less than 30 min, the forecasting effect of TREC is good, whereas that of SVM is good. With the upgrading of Doppler weather radar in China in recent years, the research on dual-polarization radar has emerged at the right moment. In the statistic of characteristic indicators of polarization parameters, the identification of polarization characteristics such as $Z_{dr}$ column, $K_{dp}$ column, $Zd_r$ arc and $K_{dp}$ print play a great role in the short-term nowcasting early-warning of severe convection. Some scholars have classified and discussed the weather types, and obtained the polarization parameter indicators matched with the forecasting and early-warning service of the local meteorological department. Yang Zhonglin et al have statistically analyzed microphysical characteristics and differences of two types of extreme convective precipitation systems by utilizing dual polarization radar and precipitation data from ground automatic weather stations. The analysis shows that extreme precipitation in the Meiyu period in areas between Yangze River and Huai River is mainly caused by convection of medium height. On the basis of the polarization parameters observed by X-band dual-polarization radar, Zhou YunJun classified and identified the aquatic products in thunderstorm cells, analyzed their dynamic evolution processes, and finally established a microphysical conceptual model of thunderstorm cell evolution process, to provide support for the forecasting and early-warning of thunderstorm weather. Zhang G. et al and Zhang K. et al used dual polarization radar detection in combination with numerical model analysis to explore more effective weather forecasting and early-warning methods.

In the aspect of radar detection and early warning, a 0° C.-layer bright band is one of characteristics of continuous precipitation. In stratiform cloud precipitation, due to influence by the 0° C.-layer bright band, early warning may be polluted in a certain extent. In the aspect of automatic weather stations for observation on the ground, the automatic weather stations have shortcomings of uneven spatial distribution and low resolution, are sparsely distributed in mountainous areas and other places to have blind areas of observation, and have a lag in time. Generally, the data returned by the automatic weather stations lag about 7 minutes, so there is a lag between the occurrence of disaster weather in the air and the observation of the phenomenon on the ground. In the aspect of model forecast, the index forecast is only used for analyzing the potential and forecasting the general trend, and can only be used as a reference for forecasting and early warning, but not as an early-warning indicator.

In the existing thunderstorm gale early-warning technology, radar short-term imminent extrapolation is used for extrapolation according to the echo intensity, so the strength enhancement of local convection cells cannot be forecasted, and enhancement characteristics of convection gale can also not be forecasted and early warned. When the characteristics of ground gale are observed by the automatic weather station, a disaster usually has already occurred. Therefore, the early warning of thunderstorm gale based on the automatic weather station has a lag problem; and coastal systematic gale needs to be distinguished from the thunderstorm gale by means of radar and lightning data. The numerical model lacks forecasting products of thunderstorm gale, so direct early-warning of thunderstorm gale cannot be performed. The dual-polarization service radar can be directly applied to thunderstorm gale products, including mesocyclone and tornado indicating products; but both of them are direct inversion products based on Doppler radial speed, so the clutter or noise information of radial speed will cause the generation of wrong inversion information.

In addition, the mesocyclone is not unique or necessary to generate thunderstorm gale. Moreover, when a strong mesocyclone or tornado indicator occurs in the lower level, it indicates that the ground gale disaster may be close to happening, so a time advance for the early warning of thunderstorm gale is relatively limited. Therefore, a novel thunderstorm gale early-warning method is urgently needed.

Through the above analysis, problems and defects in the prior art are as follows:

(1) In the aspect of radar detection and early warning, the 0° C.-layer bright band is one of characteristics of continuous precipitation; in stratiform cloud precipitation, due to influence by the 0° C.-layer bright band, early warning may be polluted in a certain extent; and in the aspect of model forecast, the index forecast is only used for analyzing the potential and forecasting the general trend, and can only be used as a reference for forecasting and early warning, but not as an early-warning indicator.

(2) In the aspect of automatic weather stations for observation on the ground, the automatic weather stations have shortcomings of uneven spatial distribution and low resolution, are sparsely distributed in mountainous areas and other places to have blind areas of observation, and have a lag in time; and generally, the data returned by the automatic weather stations lag about 7 minutes, so there is a lag between the occurrence of disaster weather in the air and the observation of the phenomenon on the ground.

(3) In the existing thunderstorm gale early-warning technology, radar short-term imminent extrapolation is used for extrapolation according to the echo intensity, so the strength enhancement of local convection cells cannot be forecasted, and enhancement characteristics of convection gale can also not be forecasted and early warned.

(4) When the characteristics of ground gale are observed by the automatic weather station, a disaster usually has already occurred; therefore, the early warning of thunderstorm gale based on the automatic weather station has a lag problem; and coastal systematic gale needs to be distinguished from the thunderstorm gale by means of radar and lightning data.

(5) The numerical model lacks forecasting products of thunderstorm gale, so direct early-warning of thunderstorm gale cannot be performed; and the dual-polarization service radar can be directly applied to thunderstorm gale products, including mesocyclone and tornado indicating products; but both of them are direct inversion products based on Doppler radial speed, so the clutter or noise information of radial speed will cause the generation of wrong inversion information.

Difficulty of solving the above problems and defects is as follows:

In the design of a thunderstorm gale early-warning algorithm, it should be considered that the radar data are fully utilized to remove the problem of 0° C.-layer bright band. Secondly, the polarization characteristics should be fully utilized to identify and count the existing state of airborne ice phase particles closely related to the thunderstorm gale, to improve the identification rate of local hailstorm gale. Finally, in the design of algorithm, not only the information of happened gale disaster detected by the ground automatic weather station but also the radar data should be fully considered; and the multivariate observation data should be fused and analyzed by mathematical modeling and computer identification and analysis technologies, thereby realizing the early warning of thunderstorm gale.

Significance of solving the above problems and defects is as follows:

The method provided by the present invention is used for automatically generating a relatively reliable thunderstorm gale service forecasting and early-warning product based on the service dual-polarization radar data and the automatic weather station data. The early-warning product can detect the area affected by potential ground gale disasters earlier than the automatic weather station, so it can provide a better scientific reference for the 0-1 hour advance service early-warning of thunderstorm gale, and provide a favorable meteorological science and technology support for meteorological disaster prevention and mitigation.

SUMMARY

In view of the problems in the prior art, the present invention provides a thunderstorm gale early-warning method and system, equipment, and a terminal, in particular to a 0-1 hour thunderstorm gale early-warning method and system, equipment, and a terminal based on polarization radar.

The present invention is realized as follows: a thunderstorm gale early-warning method comprises:

firstly, preprocessing single radar data; then, combining ground thunderstorm gale information observed by an automatic weather station to establish a potential thunderstorm gale area identification model and a thunderstorm gale parameter inversion model; finally, applying the model to real-time thunderstorm gale early-warning service; and in real-time service, calling the thunderstorm gale parameter model in the potential thunderstorm gale areas identified by single radar every time to perform extrapolation for 1 hour, thereby forming a thunderstorm gale early-warning product within the next hour.

Further, the thunderstorm gale early-warning method comprises the following steps:

Step 1, preprocessing data: preprocessing single radar data;

Step 2, identifying a moving speed of a convection system;

Step 3, identifying potential thunderstorm gale areas; and

Step 4, generating a thunderstorm gale early-warning product within the next hour.

Further, the step 1 of preprocessing data comprises:

after performing bilinear interpolation on single radar data to obtain constant-elevation angle surface grid-point data and constant-height surface grid-point data, inversing a wind vector field on a 3 km constant-height surface with a CLTREC method; and marking all grid points with an echo intensity greater than 35 dBZ based on reflectivity grid-point data of the 3 km constant-height surface as convection grid points.

Further, the step 2 of identifying a moving speed of a convection system comprises:

performing 3×3 area expansion processing on the convection identification grid-point data, and identifying the convection cells by the clustering method; for all grid point positions in an area of each convection cell, inversing a wind vector $V_g$ with the corresponding CLTREC method, and finally calculating the moving speed $V_s$ of each convection cell by weighted statistic:

$$V_s = (\Sigma_{i=1}^{N} V_g(i) * R(i)) / (\Sigma_{i=1}^{N} R(i)) \qquad (1)$$

wherein i represents an ith grid point in a range of strong convection cells; there are N grid points in a range of convection cells; and a grid point echo intensity R is selected as a weight coefficient.

Further, the step 3 of identifying potential thunderstorm gale areas comprises:

(1) identifying a maximum radial wind speed of each grid point position (X, Y) in a vertical direction based on grid-point data $Vel_{ppi}$ of a radial wind field on the constant-elevation angle surface:

$$Vel_{max}(x,y) = MAX(Vel_{ppi}(e,x,y)) e \leq E_{max} \qquad (2)$$

wherein e represents an eth elevation layer in total $E_{max}$ elevation layers; on this basis, $V_g \geq 12$ m/s in jet stream areas is identified, and the grid points in all jet stream areas are marked;

(2) after identifying the potential jet stream areas, identifying the dry hail and wet hail areas according to polarization characteristics of dual polarization radar by the following discrimination method:

for a grid point marked as the convection area, if Formula (3) is satisfied, judging that the grid point has hail influence, i.e., the echo top height $ETOP_{18dBZ}$, i.e., the maximum height of echo >18 dBZ is greater than a height $H_{-20°}$ at −20° C. by at least 1 km, the correlation coefficient $\Sigma_{HV}$ on an elevation layer vertically corresponding to the grid point is less than 0.95, and the echo intensity Z is greater than 45 dBZ; meanwhile, recording each piece of height information of hail in the vertical direction of the grid point;

$$\mathrm{ETOP}_{18dBZ} > (H_{-\circ}+1.0) \cap \rho_{HV} < 0.95 \cap Z > 45 \quad (3);$$

continuing to distinguish the wet hail from the dry hail by a differential reflectivity $Z_{dr}$ and a differential phase shift $K_{dp}$; judging that the hail is dry hail if the following conditions of Formula (4) are satisfied: a differential reflectivity $Z_{dr}$ is approximate to 0 and a differential phase shift $K_{dp}$ is low; and judging that the hail is wet hail in the rest cases;

$$Z_{dr} < 0.5 \cap K_{dp} < 0.5 \quad (4)$$

(3) combining historical examples, and defaulting the length of a past quarter or the length of a first quarter in the same period in history to construct a correlation model of thunderstorm gale information and polarization quantity observed by the automatic weather station, wherein the polarization quantity is used as a characterization factor of thunderstorm gale estimation in the inversion model, and the authenticity of inversion results is tested by thunderstorm gale observed by the automatic weather station; the observation true value standard of thunderstorm gale is defined as follows: the automatic weather station observes gale, i.e., gale above force 8, and there is at least one piece of lightning monitoring information within 5 km from the automatic weather station within 1 hour; to achieve the goal, two types of models need to be constructed as follows: (a) constructing a height distribution probability statistical model of wet hail and dry hail prone to thunderstorm gale:

performing backward particle tracking on the basis of one-minute step length according to a 3 km inversed wind vector field and a semi-Lagrangian method, i.e., Formula 5, to find out a moving track of grid points in a gale area in the past hour; counting a reference height layer frequency of wet hail and dry hail suitable for thunderstorm gale in the past hour by Formula 6; generating distribution probability statistical results of heights prone to thunderstorm gale and corresponding to wet hail and dry hail, and selecting a height corresponding to the height probability close to 33.3% as a filtering threshold according to the assumption of Gaussian probability model;

$$Pos_{-t} = Pos_{-(t-1)} - Ver_{pos-(t-1)} \quad (5)$$

wherein Formula (5) indicates that the tracking position within the past t minute is a position in the past t−1 minute minus the wind vector corresponding to the position in the past t−1 minute, in km/min; and after continuous calculation for 60 minutes by using Formula (5), the moving track of the grid points generating thunderstorm gale in the past hour can be tracked;

$$H_{standar} = \mathrm{LROUND}((H_{hail} - H_{2km})/(H_{-20\circ} - H_{2km}) \ast 10) \quad (6)$$

calculating the reference height layer according to Formula (6), and counting a height range from $H_{2km}$ to $H_{-20\circ}$, i.e., a frequency of occurrence of hail in different height layers from 2 km to −20° temperature layer, wherein LROUND represents a rounding function;

(b) constructing a thunderstorm gale intensity model for inversing polarization in wet hail and dry hail areas: after obtaining the moving track of gale grid points in the past hour, constructing a thunderstorm gale intensity model in the wet hail and dry hail areas; for the grid points in the wet hail area, screening out a maximum value of differential phase shift Kdp of all hail characteristics in the vertical direction corresponding to hail grid points in the past hour according to the height distribution probability statistical model of wet hail and dry hail prone to thunderstorm gale, and constructing a second-order fitting statistical model by using a partial least square method in combination with the thunderstorm gale intensity value of the automatic weather station; for the grid points in the dry hail area, similarly, screening out hail grid points in the past hour according to the height distribution probability statistical model of wet hail and dry hail prone to thunderstorm gale, collecting the maximum values of all hail characteristic echo intensities Z in the corresponding vertical direction, and constructing a second-order fitting statistical model by using the partial least square method in combination with the maximum values and the thunderstorm gale intensity value of the automatic weather station;

(4) synthesis of multivariate data-fused potential thunderstorm gale areas: the potential thunderstorm gale areas are mainly composed of three parts: local enhanced thunderstorm gale areas, systematic thunderstorm gale areas, and potential thunderstorm gale areas identified by traditional mesocyclone and tornado characteristics, comprises:

(4.1) identifying potential local enhanced thunderstorm gale areas:

if a current grid point is a characteristic mark of wet hail, utilizing the dynamically updated correlation model of thunderstorm gale information and polarization quantity observed by the automatic weather station of wet hail to calculate local areas potential for thunderstorm gale, and marking the areas as potential thunderstorm gale grid points; and if the current grid point is a characteristic mark of dry hail, utilizing the dynamically updated correlation model of thunderstorm gale information and polarization quantity observed by the automatic weather station of dry hail to calculate local areas potential for thunderstorm gale, and marking the areas as potential thunderstorm gale grid points.

(4.2) identifying a potential systematic thunderstorm gale area:

if the moving speed of a current convection cell is greater than the speed of force 7 wind and there is at least one grid point with a corresponding inversion wind vector greater than the speed of force 8 wind in a current convection cell range, marking all grid points in the convection area as potential thunderstorm gale grid points.

(4.3) identifying potential thunderstorm gale based on characteristics of mesocyclone and tornado:

performing spatiotemporal characteristic matching analysis on mesocyclone products, tornado characteristic identification products and the strongest echo in the radar combination reflectivity searched near the corresponding positions, i.e., within a radius of 5 km; if it does not match, judging that the mesocyclone and tornado is wrong inversion information and will not be considered; continuing to judge the remaining reasonably identified information of the mesocyclone and tornado, and if the maximum speed difference in the middle layer is greater than the speed of force 8 wind, marking all grid points in the identified area of the mesocyclone or tornado as potential thunderstorm gale grid points.

Further, wherein the step 4 of generating a thunderstorm gale early-warning product within the next hour specifically comprises:

taking a potential thunderstorm gale grid point field as an initial field, taking a wind vector field inversed based on the 3 km constant-height surface as an extrapolation field, and adopting the semi-Lagrangian backward extrapolation strategy, i.e., Formula 5, extrapolating for 60 minutes at an interval of 1 minute; and marking all grid points marked by occurrence of thunderstorm gale within 60 minutes as thunderstorm gale early-warning grid points of 0-1 hour.

Another objective of the present invention is to provide a thunderstorm gale early-warning system, comprising:

a data preprocessing module, used for preprocessing data;

a moving speed identification module, used for identifying a moving speed of a convection system;

a gale area identification module, used for identifying potential thunderstorm gale areas; and an early-warning product generation module, used for generating a thunderstorm gale early-warning product within the next hour.

Another objective of the present invention is to provide computer equipment, which comprises a memory and a processor, wherein the memory stores a computer program; and the computer program, when being executed by the processor, enables the processor to implement the following steps:

firstly, preprocessing single radar data; then, combining ground thunderstorm gale information observed by an automatic weather station to establish a potential thunderstorm gale area identification model and a thunderstorm gale parameter inversion model; finally, applying the model to real-time thunderstorm gale early-warning service: and in real-time service, calling the thunderstorm gale parameter model in the potential thunderstorm gale areas identified by single radar every time to perform extrapolation for 1 hour, thereby forming a thunderstorm gale early-warning product within the next hour.

Another objective of the present invention is to provide a computer readable storage medium, storing a computer program, wherein the computer program, when being executed by the processor, enables the processor to implement the following steps:

firstly, preprocessing single radar data: then, combining ground thunderstorm gale information observed by an automatic weather station to establish a potential thunderstorm gale area identification model and a thunderstorm gale parameter inversion model; finally, applying the model to real-time thunderstorm gale early-warning service: and in real-time service, calling the thunderstorm gale parameter model in the potential thunderstorm gale areas identified by single radar every time to perform extrapolation for 1 hour, thereby forming a thunderstorm gale early-warning product within the next hour.

Another objective of the present invention is to provide an information data processing terminal, which is used for realizing the 0-1 hour thunderstorm gale early-warning system.

By combining all the above technical solutions, the present invention has the advantages and positive effects that the 0-1 hour thunderstorm gale early-warning method provided by the present invention makes full use of the identification technology of dual-polarization radar on the basis of the traditional thunderstorm gale and the experience of meteorology to identify the potential of thunderstorm gale, and acquires the falling areas of potential thunderstorm gale in the next hour by the extrapolation technology. The method provided by the present invention well makes up for the technical weakness of objective forecast of thunderstorm gale approaching above force 8 in meteorological service; and the technology can provide excellent meteorological technical support for time advance and precision of thunderstorm gale forecast and early-warning in service.

BRIEF DESCRIPTION OF DRAWINGS

To explain the technical solutions of embodiments of the present invention more clearly, the accompanying drawings needed in the embodiments of the present invention will be briefly introduced. Apparently, the accompanying drawings described below are only some embodiments of the present invention. Those ordinary skilled in the art can acquire other accompanying drawings according to these accompanying drawings without any creative effort.

In the figure: 1. data preprocessing module; 2. moving speed identification module; 3. gale area identification module; and 4. early-warning product generation module.

Figure 3:
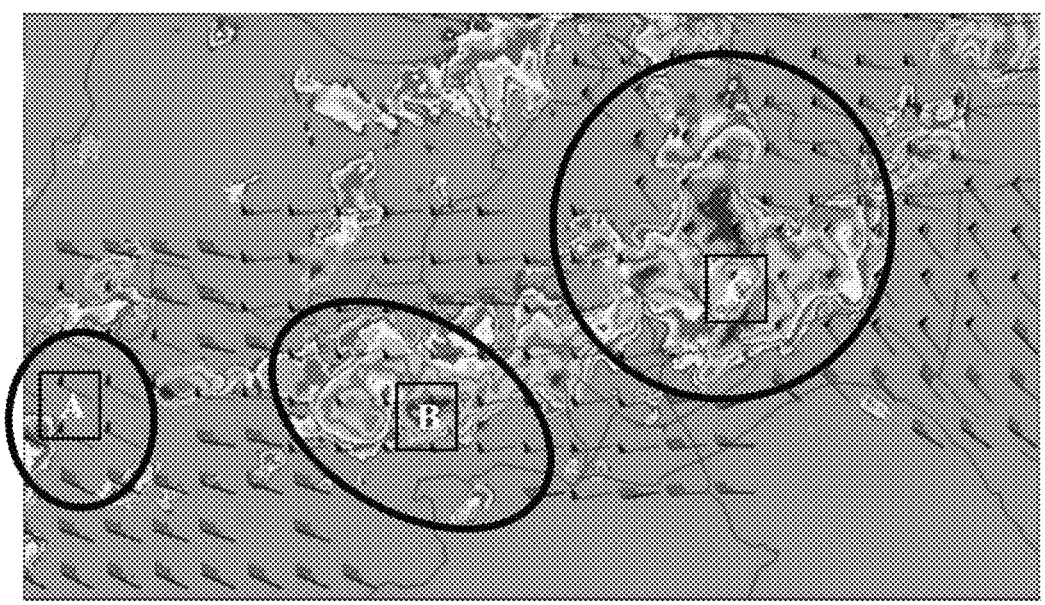

FIG. 3 is an area chart of thunderstorm gale forecast for 1 hour provided by an embodiment of the present invention (thunderstorm gale forecast for the next hour at 13:00 on Sep. 2, 2021).

Figure 4:
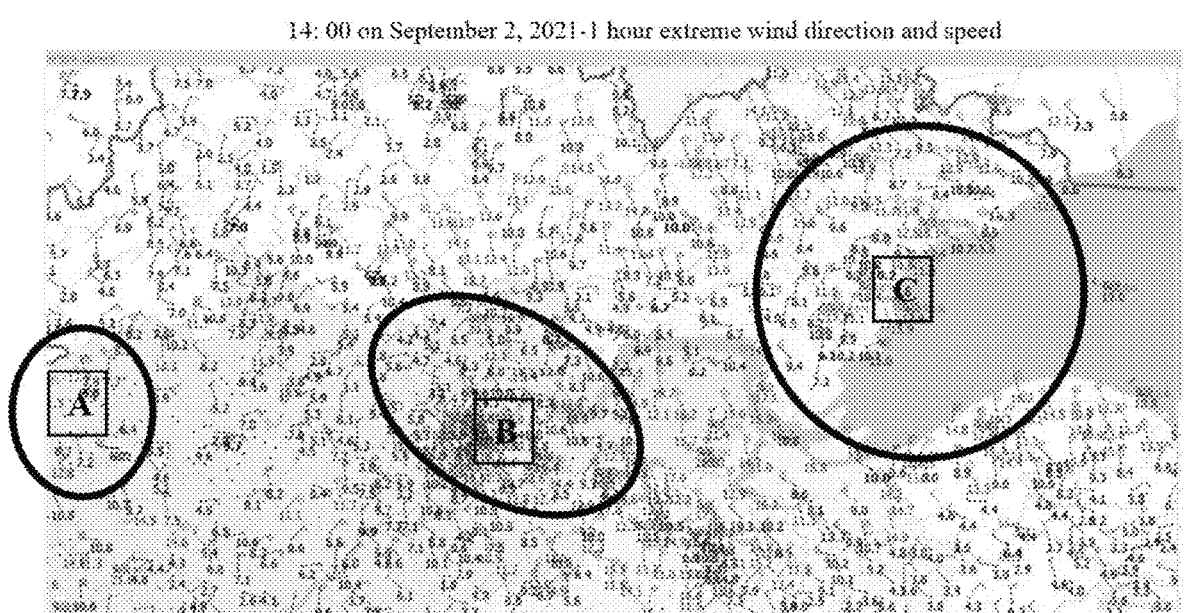

FIG. 4 is an area chart of thunderstorm gale of areas A, B and C provided by an embodiment of the present invention (extreme wind observed by an automatic weather station in the past hour at 14:00 on Sep. 2, 2021).

DETAILED DESCRIPTION OF THE EMBODIMENTS

To make the objectives, technical solutions and advantages of the present invention clearer, the present invention will be further explained in detail below in combination with embodiments. It should be understood that the specific embodiments described here are only used for explaining the present invention, rather than limiting the present invention.

In view of the problems in the prior art, the present invention provides a 0-1 hour thunderstorm gale early-warning method and system, equipment, and a terminal. The present invention will be described in detail below in combination with the accompanying drawings.

Figure 1:
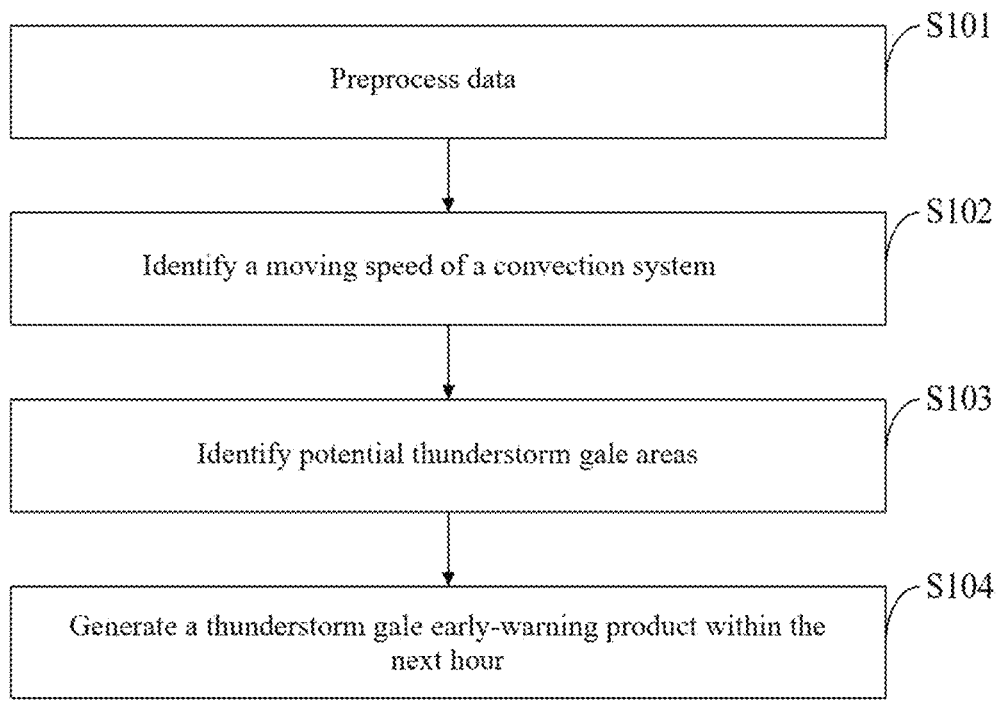
FIG. 1 is a flowchart of a 0-1 hour thunderstorm gale early-warning method provided by an embodiment of the present invention.

As shown in FIG. 1, the 0-1 hour thunderstorm gale early-warning method provided by an embodiment of the present invention comprises the following steps:

S101, preprocessing data;

S102, identifying a moving speed of a convection system;

S103, identifying potential thunderstorm gale areas; and

S104, generating a thunderstorm gale early-warning product within the next hour.

Figure 2:
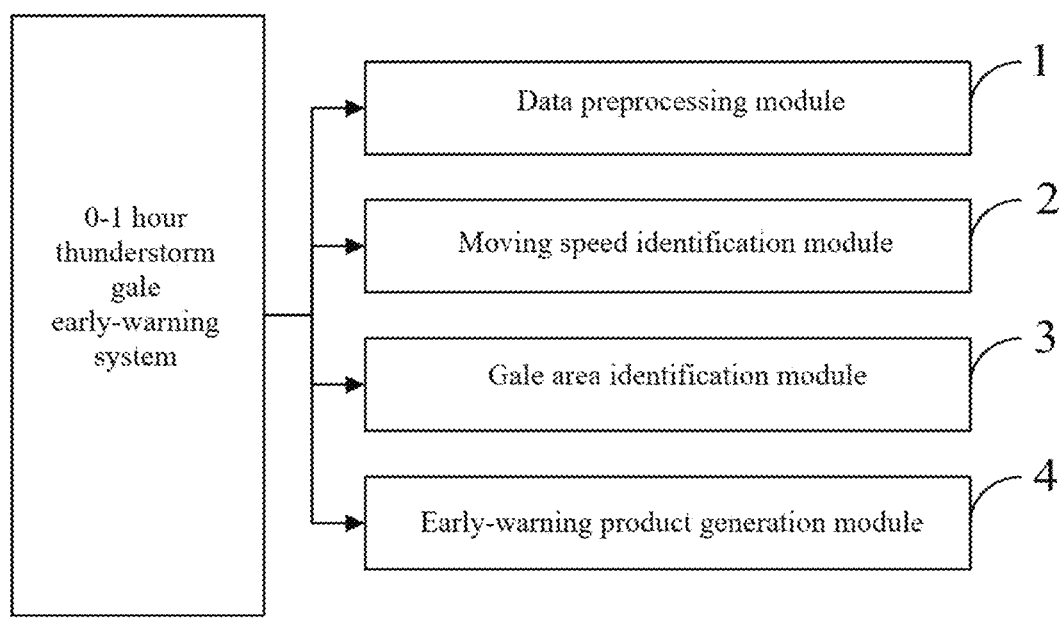
FIG. 2 is a structural block diagram of a 0-1 hour thunderstorm gale early-warning system provided by an embodiment of the present invention.

As shown in FIG. 2, the 0-1 hour thunderstorm gale early-warning system provided by an embodiment of the present invention comprises:

a data preprocessing module 1, used for preprocessing data;

a moving speed identification module 2, used for identifying a moving speed of a convection system;

a gale area identification module 3, used for identifying potential thunderstorm gale areas; and an early-warning product generation module 4, used for generating a thunderstorm gale early-warning product within the next hour.

The technical solutions of the present invention will be further described below in combination with the following specific embodiments.

The 0-1 hour thunderstorm gale early-warning method provided by the present invention makes full use of the identification technology of dual-polarization radar on the basis of the traditional thunderstorm gale and the experience of meteorology to identify the potential of thunderstorm gale, and acquires the falling areas of potential thunderstorm gale in the next hour by the extrapolation technology.

Compared with the existing thunderstorm gale early-warning method in service, the technology has better advance and precision.

1. Algorithm

The present invention proposes an automatic forecasting and early-warning technology for thunderstorm gale within one hour based on the fusion and analysis of dual polarization radar and automatic weather station data.

According to the technology, firstly, single radar data are preprocessed. Then, ground thunderstorm gale information observed by an automatic weather station is combined to establish a potential thunderstorm gale area identification model and a thunderstorm gale parameter inversion model. Finally, the model is applied to real-time thunderstorm gale early-warning service. In real-time service, the thunderstorm gale parameter model is called in the potential thunderstorm gale areas identified by single radar every time to perform extrapolation for 1 hour, thereby forming a thunderstorm gale early-warning product within the next hour.

1.1 Data Preprocessing

Bilinear interpolation is performed on single radar data to obtain constant-elevation angle surface grid-point data and constant-height surface grid-point data; and then, a wind vector field is inversed on a 3 km constant-height surface with a CLTREC method proposed by Huang Xuanxuan et al. Next, all grid points with an echo intensity greater than 35 dBZ based on reflectivity grid-point data of the 3 km constant-height surface are marked as convection grid points.

In "Application of Improved TREC Extrapolation Method in Typhoon-induced Approaching Rainfall Forecast" published by Huang Xuanxuan et al, an improved COTREC method (CLTREC) proposed is obtained by adding the continuous constraint test of the echo intensity at the adjacent time and the total variation correction of the vector on the basis of the traditional COTREC method, so that the inversed radar echo moving vector fields are more continuous. Three examples of landing typhoon were selected to test the method. The results show that the extrapolated moving vector field of the CLTREC method is smoother than that of the traditional COTREC method, and the typhoon circulation characteristics are more reasonable. The precipitation shape, intensity and location forecasted based on CLTREC extrapolation are closer to the observation; and the correlation coefficient between typhoon-induced quantitative rainfall forecast and observation in 1 hour is greater than 0.7. In general, compared with the traditional COTREC method, the CLTREC method improves the forecast accuracy of typhoon-induced short-term approaching rainfall.

1.2 Identification of Moving Speed of Convection System

Firstly, 3×3 area expansion processing is performed on the convection identification grid-point data; and the convection cells are identified by the clustering method. For all grid point positions in an area of each convection cell, a wind vector V is inversed with the corresponding CLTREC method; and finally, the moving speed VS (Formula 1) of each convection cell is calculated by weighted statistic.

$$V_s = (\Sigma_{i=1}^{N} V_g(i) * R(i)) / (\Sigma_{i=1}^{N} R(i)) \quad (1)$$

wherein i represents an ith grid point in a range of strong convection cells (N grid points in total).

1.3 Identification of Potential Thunderstorm Gale Areas 1) identifying a maximum radial wind speed of each grid point position (X, Y) in a vertical direction based on grid-point data $Vel_{ppi}$ of a radial wind field on the constant-elevation angle surface:

$$Vel_{max}(x,y) = \text{MAX}(Vel_{ppi}(e,x,y)) e \leq E_{max} \quad (2)$$

wherein e represents an eth elevation layer in total $E_{max}$ elevation layers; on this basis, $V_g \geq 12$ m/s in jet stream areas is identified, and the grid points in all jet stream areas are marked;

2) after identifying the potential jet stream areas, identifying the dry hail and wet hail areas according to polarization characteristics of dual polarization radar by the following discrimination method:

(1) for a grid point marked as the convection area, if Formula (3) is satisfied, judging that the grid point has hail influence, i.e., the echo top height $ETOP_{18dBZ}$, i.e., the maximum height of echo >18 dBZ is greater than a height $H_{-20°}$ at $-20°$ C. by at least 1 km, the correlation coefficient $\rho_{HV}$ on an elevation layer vertically corresponding to the grid point is less than 0.95, and the echo intensity Z is greater than 45 dBZ; meanwhile, recording each piece of height information of hail in the vertical direction of the grid point:

$$ETOP_{18dBZ} > (H_{-°} + 1.0) \cap \rho_{HV} < 0.95 \cap Z > 45 \quad (3);$$

continuing to distinguish the wet hail from the dry hail by a differential reflectivity Zdr and a differential phase shift Kdp; judging that the hail is dry hail if the following conditions of Formula (4) are satisfied: a differential reflectivity Zdr is approximate to 0 and a differential phase shift Kdp is low; and judging that the hail is wet hail in the rest cases;

$$Z_{dr} < 0.5 \cap K_{dp} < 0.5 \quad (4)$$

The existing observations show that, with the falling of a mass center of hail, the momentum of high level will be spread downward, thereby increasing the wind speed of strong convective gale. In the process of falling, wet hail will melt, drag and release latent heat, thereby further strengthening the heavy precipitation and thunderstorm gale intensity in the areas. In addition, the intensity of thunderstorm gale is related to the temperature difference between high and low altitudes, while there are differences in temperature difference and humidity between high and low altitudes in the environment corresponding to wet hail and dry hail, so the parameters will be classified and counted later.

3) combining historical examples, and defaulting the length of a past quarter or the length of a first quarter in the same period in history to construct a correlation model of thunderstorm gale information and polarization quantity observed by the automatic weather station, wherein the polarization quantity is used as a characterization factor of thunderstorm gale estimation in the inversion model, and the authenticity of inversion results is tested by thunderstorm gale observed by the automatic weather station; the observation true value standard of thunderstorm gale is defined as follows: the automatic weather station observes gale, i.e., gale above force 8, and there is at least one piece of lightning monitoring information within 5 km from the automatic weather station within 1 hour; to achieve the goal, two types of models need to be constructed as follows: (a) constructing a height distribution probability statistical model of wet hail and dry hail prone to thunderstorm gale:

firstly, performing backward particle tracking on the basis of one-minute step length according to a 3 km inversed wind vector field and a semi-Lagrangian method, i.e., Formula 5, to find out a moving track of grid points in a gale area in the past hour; counting a reference height layer frequency of wet hail and dry hail suitable for thunderstorm gale in the past hour by Formula 6; generating distribution probability statistical results of heights prone to thunderstorm gale and corresponding to wet hail and dry hail, and selecting a height corresponding to the height probability close to 33.3% as a filtering threshold according to the assumption of Gaussian probability model:

$$Pos_{-t} = Pos_{-(t-1)} - Ver_{pos-(t-1)} \qquad (5)$$

wherein Formula (5) indicates that the tracking position within the past t minute is a position in the past t−1 minute minus the wind vector corresponding to the position in the past t−1 minute, in km/min; and after continuous calculation for 60 minutes by using Formula (5), the moving track of the grid points generating thunderstorm gale in the past hour can be tracked;

$$H_{standar} = \text{LROUND}((H_{hail} - H_{2km})/(H_{-20°} - H_{2km})*10) \qquad (6)$$

calculating the reference height layer according to Formula (6), and counting a height range from H2km to $H_{-20°}$, i.e., a frequency of occurrence of hail in different height layers from 2 km to −20° temperature layer, wherein LROUND represents a rounding function;

(b) constructing a thunderstorm gale intensity model for inversing polarization in wet hail and dry hail areas: after obtaining the moving track of gale grid points in the past hour, constructing a thunderstorm gale intensity model in the wet hail and dry hail areas; for the grid points in the wet hail area, screening out a maximum value of differential phase shift Kdp of all hail characteristics in the vertical direction corresponding to hail grid points in the past hour according to the height distribution probability statistical model of wet hail and dry hail prone to thunderstorm gale, and constructing a second-order fitting statistical model by using a partial least square method in combination with the thunderstorm gale intensity value of the automatic weather station; for the grid points in the dry hail area, similarly, screening out hail grid points in the past hour according to the height distribution probability statistical model of wet hail and dry hail prone to thunderstorm gale, collecting the maximum values of all hail characteristic echo intensities Z in the corresponding vertical direction, and constructing a second-order fitting statistical model by using the partial least square method in combination with the maximum values and the thunderstorm gale intensity value of the automatic weather station;

4) Synthesis of Multivariate Data-Fused Potential Thunderstorm Gale Areas

Thunderstorm gale areas may subject to mobile systematic gale, or local enhanced convection gale caused by factors such as downward spreading of momentum after melting, dragging and latent heat releasing. Therefore, the potential thunderstorm gale areas are mainly composed of three parts: local enhanced thunderstorm gale areas, systematic thunderstorm gale areas, and potential thunderstorm gale areas identified by traditional mesocyclone and tornado characteristics.

(4.1) Identifying Potential Local Enhanced Thunderstorm Gale Areas:

if a current grid point is a characteristic mark of wet hail, utilizing the dynamically updated correlation model of thunderstorm gale information and polarization quantity observed by the automatic weather station of wet hail to calculate local areas potential for thunderstorm gale, and marking the areas as potential thunderstorm gale grid points; and if the current grid point is a characteristic mark of dry hail, utilizing the dynamically updated correlation model of thunderstorm gale information and polarization quantity observed by the automatic weather station of dry hail to calculate local areas potential for thunderstorm gale, and marking the areas as potential thunderstorm gale grid points.

(4.2) Identifying a Potential Systematic Thunderstorm Gale Area:

if the moving speed of a current convection cell is greater than the speed of force 7 wind and there is at least one grid point with a corresponding inversion wind vector greater than the speed of force 8 wind in a current convection cell range, marking all grid points in the convection area as potential thunderstorm gale grid points.

(4.3) Identifying Potential Thunderstorm Gale Based on Characteristics of Mesocyclone and Tornado:

performing spatiotemporal characteristic matching analysis on mesocyclone products, tornado characteristic identification products and the strongest echo in the radar combination reflectivity searched near the corresponding positions, i.e., within a radius of 5 km; if it does not match, judging that the mesocyclone and tornado is wrong inversion information and will not be considered; continuing to judge the remaining reasonably identified information of the mesocyclone and tornado, and if the maximum speed difference in the middle layer is greater than the speed of force 8 wind, marking all grid points in the identified area of the mesocyclone or tornado as potential thunderstorm gale grid points.

1.4 Generation of Thunderstorm Gale Early-Warning Product within the Next Hour taking a potential thunderstorm gale grid point field as an initial field, taking a wind vector field inversed based on the 3 km constant-height surface as an extrapolation field, and adopting the semi-Lagrangian backward extrapolation strategy, i.e., Formula 5, extrapolating for 60 minutes at an interval of 1 minute; and marking all grid points marked by occurrence of thunderstorm gale within 60 minutes as thunderstorm gale early-warning grid points of 0-1 hour.

The technical solutions of the present invention will be further described below in combination with specific experimental data.

The thunderstorm gale process in northern area of Zhejiang Province on Sep. 2, 2021 was taken as an example; and the capability of the algorithm provided by the present invention was evaluated based on the radar data of Huzhou by taking the actual thunderstorm gale observed by the automatic weather station as a benchmark. The comparison between FIG. 3 (thunderstorm gale area forecast for 1 hour) and FIG. 4 (three thunderstorm gale areas A, B and C (black circle, areas with actually observed thunderstorm gale above force 8)) shows that:

1) The speeds of extreme wind observed by the automatic weather station in the areas in the past hour are forces 8-10 (the corresponding wind speed range is 17.2 m/s to 28.4 m/s), while the forecasted thunderstorm gale speeds in the corresponding areas range from 20 m/s to 26 m/s. Therefore, the two are well matched in the magnitude of the forecast, which indicates that the algorithm has certain nowcasting ability to the force 8-10 thunderstorm gales. In addition, the comparison of falling area forecast of thunderstorm gale shows that in three areas (A, B, C) where thunderstorm gale occurred apparently, the forecast results basically forecast the corresponding thunderstorm gale information, and relatively less information is missed. Of course, there are some overestimation problems in the north of the three black circle areas (force 5-6 thunderstorm gales occurred actually, but force 8 thunderstorm gale was forecasted). However, it is difficult to forecast thunderstorm gales, and the forecasting strategy of "better mistake than miss" should be adhered for the defense of sudden catastrophic gales, so the forecasting results still have very good reference and guiding significance for forecasting. Finally, it needs to be added that because the randomness of generation of the thunderstorm gale determines the uncertainty of wind direction, and the forecasting technology more focuses on the early warning of the corresponding wind speed level prone to gale disasters in the actual thunderstorm gale forecasting and early-warning service, the evaluation for an example of the algorithm here does not need detailed evaluation and analysis on the wind direction of the forecasted thunderstorm gale.

In the description of the present invention, unless otherwise stated, "a plurality of" means two or more: azimuths or positional relationships indicated by the terms "upper", "lower", "left", "right", "inner", "outer", "front", "rear", "head", "tail" and the like are based on the azimuths or positional relationships shown in the accompanying drawings, are only used for the convenience of describing the present invention and simplifying the description, rather than indicating or implying that the referred devices or elements must have specific azimuths or be constructed and operated in specific azimuths, so the azimuths or positional relationships cannot be construed as a limitation to the present invention. In addition, the terms "first", "second", "third" and the like are only used for description, and cannot be construed as indication or implication for relative importance.

In the above-mentioned embodiments, the technical solutions can be implemented in whole or in part by software, hardware, firmware or any combination thereof. When the technical solutions are implemented in whole or in part in the form of a computer program product, the computer program product comprises one or more computer instructions. When the computer program instructions are loaded or executed on a computer, all or part of the processes or functions according to the embodiments of the present invention are generated. The computer may be a general-purpose computer, a special-purpose computer, a computer network, or other programmable devices. The computer instructions can be stored in a computer-readable storage medium or transmitted from one computer-readable storage medium to another. For example, the computer instructions can be transmitted from one website, computer, server or data center to another website, computer, server or data center in a wired manner (e.g., coaxial cable, optical fiber and digital subscriber line (DSL)) or a wireless manner (e.g., infrared, wireless and microwave). The computer-readable storage medium may be any available medium accessible to the computer or a data storage device such as an integrated server and data center including one or more available media. The available media may be magnetic media (e.g., floppy disk, hard disk and magnetic tape), optical media (e.g., DVD), semiconductor media (e.g., Solid State Disk (SSD)) or the like.

The above are only the specific embodiments of the present invention, and cannot be used for limiting the protection scope of the present invention. Any modification, equivalent substitution, improvement and the like made within the spirit and principle of the present invention by anyone of those skilled in the art should fall within the protection scope of the present invention.

What is claimed is:

1. A thunderstorm gale early-warning method, the thunderstorm gale early-warning method comprising:
   Step 1, preprocessing data: preprocessing single radar data; wherein after performing bilinear interpolation on single radar data to obtain constant-elevation angle surface grid-point data and constant-height surface grid-point data, inversing a wind vector field on a 3 km constant-height surface with a Continuity of Laplace TREC vectors method; and marking all grid points with an echo intensity greater than 35 dBZ based on reflectivity grid-point data of the 3 km constant-height surface as convection grid points;
   Step 2, identifying a moving speed of a convection system: performing area expansion processing on convection identification grid-point data, identifying convection cells by a clustering method, and finally calculating a moving speed of each convection cell by weighted statistics;
   Step 3, identifying potential thunderstorm gale areas: combining ground thunderstorm gale information observed by an automatic weather station to establish a potential thunderstorm gale area identification model and a thunderstorm gale parameter inversion model, and then applying the potential thunderstorm gale area identification model to real-time thunderstorm gale early-warning; and
   Step 4, generating a thunderstorm gale early-warning product within the next hour: in real-time service, calling the thunderstorm gale parameter model in the potential thunderstorm gale areas identified by single radar within each time step to perform extrapolation, forming the thunderstorm gale early-warning product of the future.

2. The thunderstorm gale early-warning method according to claim 1, wherein the step 2 of identifying a moving speed of a convection system specifically comprises:
   performing 3×3 area expansion processing on the convection identification grid-point data, and identifying the convection cells by the clustering method; for all grid point positions in an area of each convection cell, inversing a wind vector $V_g$ with the corresponding Continuity of Laplace CLTREC vectors method, and finally calculating the moving speed $V_s$ of each convection cell by weighted statistic:

$$V_s=(\Sigma_{i=1}^{N}V_g(i)*R(i))/(\Sigma_{i=1}^{N}R(i)) \tag{1}$$

wherein i represents an ith grid point in a range of strong convection cells; there are N grid points in a range of convection cells; and a grid point echo intensity R is selected as a weight coefficient.

3. The thunderstorm gale early-warning method according to claim 1, wherein the step 3 of identifying potential thunderstorm gale areas specifically comprises:
   (1) identifying a maximum radial wind speed of each grid point position (X, Y) in a vertical direction based on grid-point data $Vel_{ppi}$ of a radial wind field on a constant-elevation angle surface:

$$Vel_{max}(x,y)=\text{MAX}(Vel_{ppi}(e,x,y))e \leq E_{max} \tag{2}$$

wherein e represents an eth elevation layer in total $E_{max}$ elevation layers; on this basis, $V_g \geq 12$ m/s in jet stream areas is identified, and the grid points in all jet stream areas are marked;
   (2) after identifying the potential jet stream areas, identifying a dry hail and wet hail areas according to polarization characteristics of dual polarization radar;
   (3) combining historical examples, and defaulting a length of a past quarter or the length of a first quarter in the same period in history to construct a correlation model of thunderstorm gale information and polarization quantity observed by the automatic weather station, wherein the polarization quantity is used as a characterization factor of thunderstorm gale estimation in the inversion model, and the authenticity of inversion results is tested by thunderstorm gale observed by the automatic weather station; and (4) synthesizing multivariate data-fused potential thunderstorm gale areas.

4. The thunderstorm gale early-warning method according to claim 3, wherein a discrimination method adopted in the step (2) of identifying dry hail and wet hail areas comprises:

for a grid point marked as the convection area, if Formula (3) is satisfied, judging that the grid point has hail influence, the echo top height $ETOP_{18dBZ}$, the maximum height of echo >18 dBZ is greater than a height $H_{-20°}$ at $-20°$ C. by at least 1 km, the correlation coefficient $\rho_{HV}$ on an elevation layer vertically corresponding to the grid point is less than 0.95, and the echo intensity Z is greater than 45 dBZ; meanwhile, recording each piece of height information of hail in the vertical direction of the grid point;

$$ETOP_{18dBZ} > (H_{-°}+1.0) \cap \rho_{HV} < 0.95 \cap Z > 45 \quad (3);$$

continuing to distinguish the wet hail from the dry hail by a differential reflectivity $Z_{dr}$ and a differential phase shift $K_{dp}$; judging that the hail is dry hail if the following conditions of Formula (4) are satisfied: a differential reflectivity $Z_{dr}$ is approximate to 0 and a differential phase shift $K_{dp}$ is low; and judging that the hail is wet hail in the rest cases;

$$Z_{dr} < 0.5 \cap K_{dp} < 0.5 \quad (4)$$

the observation true value standard of thunderstorm gale is defined in the step (3) as follows: the automatic weather station observes gale, gale above force 8, and there is at least one piece of lightning monitoring information within 5 km from the automatic weather station within 1 hour; to achieve the goal, two types of models need to be constructed as follows:

(a) constructing a height distribution probability statistical model of wet hail and dry hail prone to thunderstorm gale: performing backward particle tracking on the basis of one-minute step length according to a 3 km inversed wind vector field and a semi-Lagrangian method, Formula 5, to find out a moving track of grid points in a gale area in the past hour; counting a reference height layer frequency of wet hail and dry hail suitable for thunderstorm gale in the past hour by Formula 6; generating distribution probability statistical results of heights prone to thunderstorm gale and corresponding to wet hail and dry hail, and selecting a height corresponding to the height probability close to 33.3% as a filtering threshold according to the assumption of Gaussian probability model;

$$Pos_{-t} = Pos_{-(t-1)} - Ver_{pos-(t-1)} \quad (5)$$

wherein Formula (5) indicates that the tracking position within the past t minute is a position in the past $t-1$ minute minus the wind vector corresponding to the position in the past $t-1$ minute, in km/min; and after continuous calculation for 60 minutes by using Formula (5), the moving track of the grid points generating thunderstorm gale in the past hour can be tracked;

$$H_{standar} = \mathrm{LROUND}((H_{hail} - H_{2km})/(H_{-20°} - H_{2km}) * 10) \quad (6)$$

calculating the reference height layer according to Formula (6), and counting a height range from $H_{2km}$ to $H_{-20°}$, a frequency of occurrence of hail in different height layers from 2 km to $-20°$ temperature layer, wherein LROUND represents a rounding function;

(b) constructing a thunderstorm gale intensity model for inversing polarization in wet hail and dry hail areas: after obtaining the moving track of gale grid points in the past hour, constructing a thunderstorm gale intensity model in the wet hail and dry hail areas;

for the grid points in the wet hail area, screening out a maximum value of differential phase shift Kdp of all hail characteristics in the vertical direction corresponding to hail grid points in the past hour according to the height distribution probability statistical model of wet hail and dry hail prone to thunderstorm gale, and constructing a second-order fitting statistical model by using a partial least square method in combination with the thunderstorm gale intensity value of the automatic weather station; for the grid points in the dry hail area, similarly, screening out hail grid points in the past hour according to the height distribution probability statistical model of wet hail and dry hail prone to thunderstorm gale, collecting the maximum values of all hail characteristic echo intensities Z in the corresponding vertical direction, and constructing a second-order fitting statistical model by using the partial least square method in combination with the maximum values and the thunderstorm gale intensity value of the automatic weather station;

the step (4) of synthesizing multivariate data-fused potential thunderstorm gale areas comprises:

(4.1) identifying potential local enhanced thunderstorm gale areas: if a current grid point is a characteristic mark of wet hail, utilizing the dynamically updated correlation model of thunderstorm gale information and polarization quantity observed by the automatic weather station of wet hail to calculate local areas potential for thunderstorm gale, and marking the areas as potential thunderstorm gale grid points; and if the current grid point is a characteristic mark of dry hail, utilizing the dynamically updated correlation model of thunderstorm gale information and polarization quantity observed by the automatic weather station of dry hail to calculate local areas potential for thunderstorm gale, and marking the areas as potential thunderstorm gale grid points;

(4.2) identifying a potential systematic thunderstorm gale area: if the moving speed of a current convection cell is greater than the speed of force 7 wind and there is at least one grid point with a corresponding inversion wind vector greater than the speed of force 8 wind in a current convection cell range, marking all grid points in the convection area as potential thunderstorm gale grid points; and (4.3) identifying potential thunderstorm gale based on characteristics of mesocyclone and tornado: performing spatiotemporal characteristic matching analysis on mesocyclone products, tornado characteristic identification products and the strongest echo in the radar combination reflectivity searched near the corresponding positions, within a radius of 5 km; if it does not match, judging that the mesocyclone and tornado is wrong inversion information and will not be considered; continuing to judge the remaining reasonably identified information of the mesocyclone and tornado, and if the maximum speed difference in the middle layer is greater than the speed of force 8 wind, marking all grid points in the identified area of the mesocyclone or tornado as potential thunderstorm gale grid points.

5. The thunderstorm gale early-warning method according to claim 1, wherein the step 4 of generating a thunderstorm gale early-warning product within the next hour specifically comprises: taking a potential thunderstorm gale grid point field as an initial field, taking a wind vector field inversed based on a 3 km constant-height surface as an extrapolation field, and adopting a semi-Lagrangian backward extrapolation strategy, Formula 5, extrapolating for 60 minutes at an interval of 1 minute; and marking all grid points marked by occurrence of thunderstorm gale within 60 minutes as thunderstorm gale early-warning grid points of 0-1 hour.

6. A thunderstorm gale early-warning system applying the thunderstorm gale early-warning method according to claim 1, wherein the thunderstorm gale early-warning system comprises:
- a data preprocessing module, used for preprocessing data;
- a moving speed identification module, used for identifying a moving speed of a convection system;
- a gale area identification module, used for identifying potential thunderstorm gale areas; and
- an early-warning product generation module, used for generating a thunderstorm gale early-warning product within the next hour.

7. A computer readable medium containing computer instructions stored therein for causing a computer processor to perform steps of the medthod according to claim 1.

8. An information data processing terminal, wherein the information data processing terminal the thunderstorm gale early-warning system according to claim 6.

\* \* \* \* \*